United States Patent
Blouin et al.

(10) Patent No.: US 8,237,869 B2
(45) Date of Patent: Aug. 7, 2012

(54) MULTI-STANDARD DIGITAL DEMODULATOR FOR TV SIGNALS BROADCAST OVER CABLE, SATELLITE AND TERRESTRIAL NETWORKS

(75) Inventors: Pascal Blouin, Domloup (FR); Frederic Nicolas, Chateaugiron (FR); David Rault, Hede-Bazouges (FR); Olivier Souloumiac, St Sulpice la Foret (FR); Emmanuel Gautier, Betton (FR); Stephane Faudeil, Cesson Sevigne (FR); Eric Vapillon, Chateaugiron (FR); Gaetan Guillaume, Laille (FR); Laurent Appercel, Rennes (FR)

(73) Assignee: Silicon Laboratories Inc., Austin, TX (US)

( * ) Notice: Subject to any disclaimer, the term of this patent is extended or adjusted under 35 U.S.C. 154(b) by 295 days.

(21) Appl. No.: 12/751,022

(22) Filed: Mar. 31, 2010

(65) Prior Publication Data

US 2011/0242428 A1 Oct. 6, 2011

(51) Int. Cl.
*H04N 5/46* (2006.01)
(52) U.S. Cl. .................................................. 348/726
(58) Field of Classification Search .................. 348/726, 348/725, 731, 732, 727; 333/18, 28 R; 375/232, 375/235, 316, 229, 230
See application file for complete search history.

(56) References Cited

U.S. PATENT DOCUMENTS

| | | | |
|---|---|---|---|
| 5,535,220 A | 7/1996 | Kanno et al. | |
| 5,754,252 A | 5/1998 | Kuhn et al. | |
| 6,128,043 A | 10/2000 | Tulder | |
| 6,542,203 B1 | 4/2003 | Shadwell et al. | |
| 6,625,234 B1 | 9/2003 | Cui et al. | |
| 6,630,964 B2 | 10/2003 | Burns et al. | |
| 6,721,908 B1 | 4/2004 | Kim et al. | |
| 6,862,325 B2 * | 3/2005 | Gay-Bellile et al. | 375/340 |
| 7,106,388 B2 * | 9/2006 | Vorenkamp et al. | 348/726 |
| 7,170,849 B1 | 1/2007 | Arivoli et al. | |
| 7,265,792 B2 | 9/2007 | Favrat et al. | |
| 7,369,835 B2 | 5/2008 | Margairas et al. | |
| 7,426,240 B2 | 9/2008 | Peron | |
| 7,440,392 B2 | 10/2008 | Hwang | |
| 2002/0085648 A1 | 7/2002 | Burns et al. | |
| 2004/0123226 A1 | 6/2004 | Lee et al. | |
| 2005/0265486 A1 | 12/2005 | Crawley | |
| 2005/0280742 A1 * | 12/2005 | Jaffe | 348/726 |

(Continued)

FOREIGN PATENT DOCUMENTS

WO WO 03067877 8/2003

(Continued)

OTHER PUBLICATIONS

U.S. Patent and Trademark Office, Office Action mailed Sep. 23, 2010 and Reply filed Dec. 20, 2010 in U.S. Appl. No. 11/903,910.

(Continued)

*Primary Examiner* — Paulos Natnael
(74) *Attorney, Agent, or Firm* — Trop, Pruner & Hu, P.C.

(57) ABSTRACT

A multi-standard single-chip receiver for digital demodulation of TV signals broadcasted over any of multiple digital television means, e.g., satellite, cable and terrestrial, is provided. The receiver can receive and demodulate a variety of different signal types received from one or more up-front tuners. A demodulator architecture in accordance with an embodiment of the present invention can be optimized to re-use common demodulation processing blocks for the different incoming signal types.

20 Claims, 10 Drawing Sheets

U.S. PATENT DOCUMENTS

| | | | |
|---|---|---|---|
| 2006/0158568 A1* | 7/2006 | Kaylani et al. | 348/725 |
| 2006/0206778 A1 | 9/2006 | Wehn et al. | |
| 2006/0222115 A1 | 10/2006 | Dornbusch et al. | |
| 2008/0086671 A1 | 4/2008 | Garg et al. | |
| 2009/0094470 A1 | 4/2009 | Gao et al. | |
| 2009/0213275 A1 | 8/2009 | Trager | |
| 2010/0110305 A1* | 5/2010 | Chou et al. | 348/726 |
| 2010/0306616 A1 | 12/2010 | Kishimoto et al. | |
| 2011/0246849 A1* | 10/2011 | Rault et al. | 714/752 |
| 2011/0246850 A1* | 10/2011 | Rault et al. | 714/752 |

FOREIGN PATENT DOCUMENTS

| | | |
|---|---|---|
| WO | WO 2007001305 A1 | 1/2007 |

OTHER PUBLICATIONS

U.S. Appl. No. 12/751,076, entitled "Techniques to Control Power Consumption in an Iterative Decoder by Control of Node Configurations," filed Mar. 31, 2010 by David Rault, et al.

U.S. Appl. No. 12/751,052, entitled "Reducing Power Consumption in an Iterative Decoder," filed Mar. 31, 2010 by David Rault, et al.

U.S. Appl. No. 12/493,955, filed Jun. 29, 2009, entitled, "Digital Signal Processor (DSP) Architecture for a Hybrid Television Tuner," by Alan Hendrickson, et al.

U.S. Appl. No. 12/603,877, filed Oct. 22, 2009, entitled, "Digital Signal Processor (DSP) Architecture for a Hybrid Television Tuner," by Alan Hendrickson, et al.

U.S. Appl. No. 12/551,146, filed Aug. 31, 2009, entitled, "Digital Phase Lock Loop Configurable As a Frequency Estimator," by Li Gao.

ETSI, Draft ETSI EN 302 307, "Digital Video Broadcasting (DVB); Second generation framing structure, channel coding and modulation systems for Broadcasting, Interactive Services, News Gathering and other broadband satellite applications," V1.1.1, 2004-2006, pp. 1-74.

MICRONAS, "DRX 3960A Digital Receiver Front-End," Feb. 8, 2001, pp. 1-30.

NXP, "TDA 8295 Digital Global Standard Low IF Demodulator for Analog TV and FM Radio," Feb. 4, 2008, pp. 1-77.

XCEIVE, "Welcome to Xceive at CES 2007, Upgrade Your Tuner! Get XC5000," 2007, pp. 1-28.

XCEIVE, "XC5000 Product Brief," Dec. 2006, pp. 1-2.

U.S. Appl. No. 12/323,040, filed Nov. 25, 2008, entitled "Low-Cost Receiver Using Automatic Gain Control," by Ramin K. Poorfard, et al.

* cited by examiner

MULTI-STANDARD DIGITAL DEMODULATOR FOR TV SIGNALS BROADCAST OVER CABLE, SATELLITE AND TERRESTRIAL NETWORKS

BACKGROUND

Historically, TV receivers were mainly only compliant to analog terrestrial TV standards such as PAL, SECAM (in Europe, China, India, S-E Asia, Brazil, etc.) or NTSC (in North America, Korea, Taiwan and Japan). With the deployment of digital TV (DTV) all over the world, and with analog TV switch-off already occurring in some countries or planned for the early 2010's, TV makers are embedding in their TV chassis additional front-end systems to receive various digital TV standards. These multiple front ends are typically by way of multiple dedicated separate tuners/demodulators each for a given DTV standard, and each realized either by way of discrete components or via an integrated circuit (IC).

This is so, as TV front-ends ought to be capable of receiving terrestrial digital TV, and digital TV distributed over cable and satellite networks, so that the consumer can select any distribution network to receive his favorite programs. At the same time, digital TV standards are, for some standards (satellite mainly), already a bit "old fashioned" and second generation standards have been created and are already being deployed in the field. Those standards can offer higher bit rates, allowing HDTV programs to be more easily broadcasted. This is already the case for the satellite distribution with the evolution of DVB-S to the DVB-S2 standard, while second generation standards such as DVB-T2 (for terrestrial) and DVB-C2 (for cable) have just passed through the ETSI standardization, and are just starting to be deployed or in the phase of testing in a few countries. The diversity of all these standards can significantly increase the cost and complexity of a mid-range/high-end TV chassis that aims to be fully "digital compliant," while at the same time the retail market is always lowering retail prices.

SUMMARY OF THE INVENTION

According to one aspect, a multi-standard demodulator can be provided for use in a host of different systems to perform demodulation of digital television signals of any type. As one non-limiting example, this demodulator can be incorporated into a system that includes multiple tuners, including a first tuner to receive and downconvert a television signal according to a terrestrial or cable standard depending on the received television signal, and a second tuner to receive and downconvert a television signal according to a satellite standard.

Each of these tuners can be coupled to the demodulator, which may include signal processing circuitry that can be used to perform processing of signals of the various standards, allowing re-use and efficiency of design. In one implementation, the demodulator may include a first analog-to-digital converter (ADC) to receive a first intermediate frequency (IF) signal from the first tuner and to convert the first IF signal to a first digital IF signal and a second ADC to receive a second IF signal from the second tuner and to convert the second IF signal to a second digital IF signal. In turn, a shared front end may be coupled to receive and convert a selected one of the first and second digital IF signals to a baseband signal. Then multiple digital demodulators may be present to digitally demodulate the baseband signal according to the given standard.

In turn, first, second and third equalizers may be coupled to the demodulators to perform equalization on the demodulated signal output from the demodulators to obtain a first, second or third equalized signal, respectively depending on the type of signal received. Each of these equalizers may in turn be coupled to a shared forward error correction (FEC) circuit to perform forward error correction on the selected one of the first, second and third equalized signals. Given the different signal types, each may be provided to a different part of the FEC circuit. Specifically, the shared FEC circuit includes a first input port to receive the first equalized signal at a beginning location of a signal processing path of the shared FEC circuit, a second input port to receive the second equalized signal at a second location of the signal processing path downstream of the beginning location, and a third input port to receive the third equalized signal at a third location of the signal processing path downstream of the second location.

Additional circuitry, such as another FEC circuit to handle particular signal types may also be present. In addition, a transport stream interface may be present to output a transport stream to further signal processing circuitry. In many implementations, the demodulator may be formed as an integrated circuit having a single semiconductor die including the above-described circuitry.

DETAILED DESCRIPTION

Figure 1:
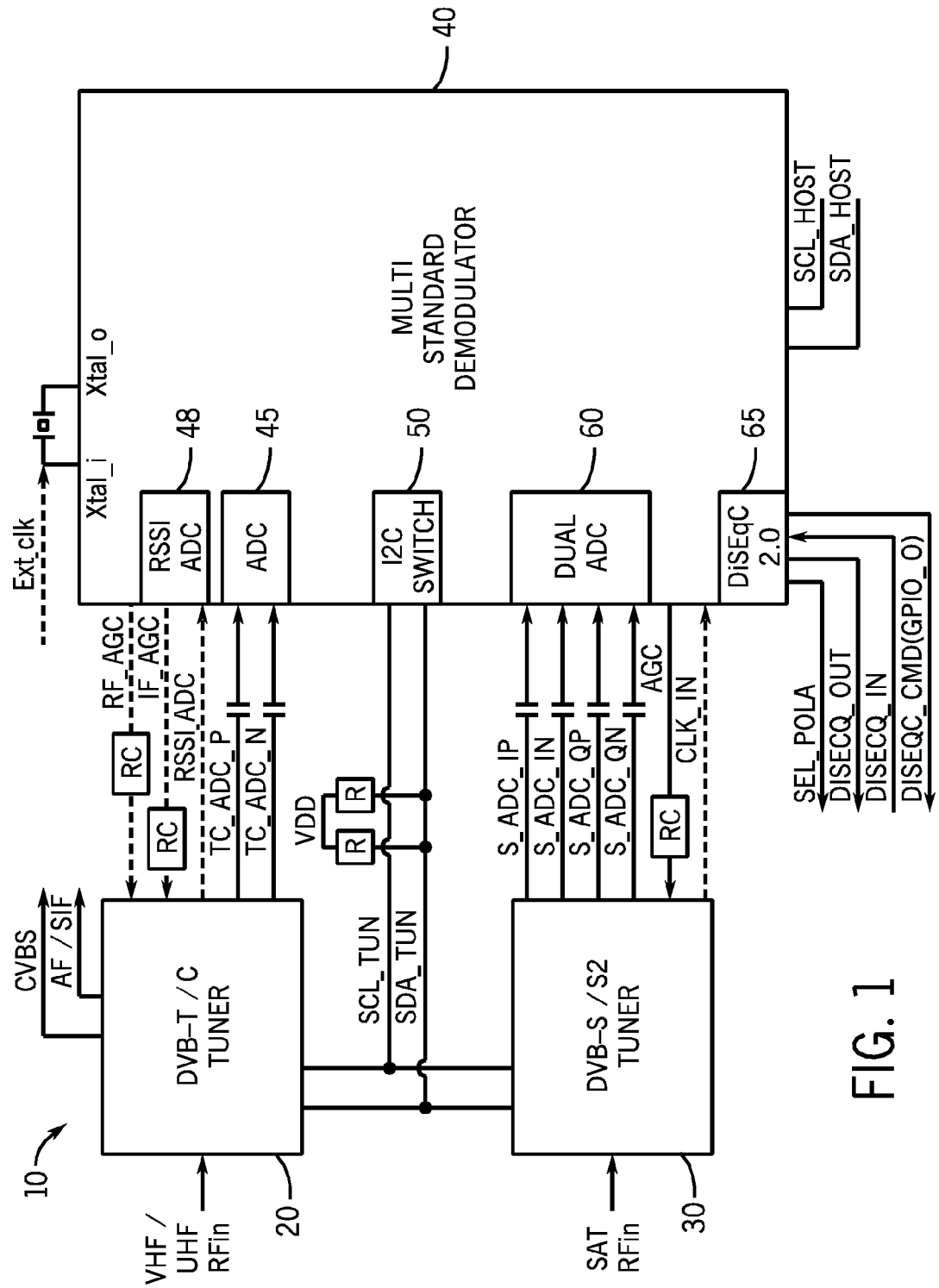
FIG. 1 is a block diagram of a typical application of a multi-standard demodulator in accordance with one embodiment of the present invention.

In various embodiments, a multi-standard single-chip receiver for digital demodulation of TV signals broadcasted over any of multiple digital television standards, e.g., satellite (DSS/DVB-S/DVB-S2), cable (DVB-C) and terrestrial (DVB-T), is provided. Embodiments may allow simplification in size, cost, bill of material and ease of use with regard to digital demodulators for DTV reception. Moreover this multi-standard single chip allows reduced power consumption in comparison with multiple ICs. This receiver can receive and demodulate a variety of different signal types received from one or more up-front tuners. As described below, such tuners may be metal can or silicon type tuners. In contrast, typical solutions require several individual digital demodulators (at least 2, and up to 4 chips) to be capable of receiving multiple DVB standards in a single system.

An architecture in accordance with an embodiment of the present invention can be optimized to re-use common demodulation processing blocks such that the global size of the multi-standard demodulator is much reduced compared to bolt-on solutions (on one or more dies) of several digital demodulators in which a fully separate signal processing path is provided for each DVB or other signal type.

In a particular embodiment, the following may be embedded in a single integrated circuit (such as on a single semiconductor die): a shared front-end suitable for all standards; a shared satellite demodulator for DVB-S/S2 and DSS; a shared demodulator central filter performing both adjacent channel interference (ACI) filtering in DVB-T and half-Nyquist matched filtering in DVB-C; a shared forward error correction (FEC) circuit for DVB-S, DVB-C, DVB-T and DSS standards; and a shared transport stream interface (such as in accordance with a given MPEG-standard) that is asynchronous to DVB and DVB-S2 FECs, to eliminate any clock relationship constraints.

For satellite reception, embodiments may further embed a high-performance Quickscan hardware accelerator, controlled by a digital signal processor (DSP), for very fast blind scan of DVB-S and DVB-S2 channels, enabling automatic standard recovery (DVB-S/DVB-S2) of satellite channels obtained during the blind scan as described below with regard to FIG. 2. For DVB-S2, a carrier recovery algorithm that allows simpler implementation; a flexible low density parity check (LDPC) decoder architecture with a programmable number of check node processor subsets per iteration to obtain an optimal trade-off between performance and power, and providing for automatic reduction of workload below a quasi-error free (QEF) level to avoid useless power dissipation.

While not limited in this regard, a demodulator in accordance with an embodiment of the present invention can be implemented in many different types of systems, ranging from portable systems on up to a television incorporating a high definition (HD) tuner. For example, a range of applications may include a full network interface module, an integrated digital television (IDTV), digital terrestrial cable and/or satellite set top boxes (STBs), PCTV accessories, personal video recorder, digital versatile disk and Blue Ray disk recorders or so forth.

Referring now to FIG. 1, shown is a block diagram of a typical application in accordance with one embodiment of the present invention. As seen in FIG. 1, a system 10 may be an application incorporated in a television, for example. In the implementation of FIG. 1, multiple separate integrated circuits may be present. Specifically, multiple independent tuners may be provided, namely a first tuner 20 and a second tuner 30. In the embodiment shown in FIG. 1, first tuner 20 may support tuning of terrestrial and cable signals in accordance with a given DTV standard such as DVB-T/C, while second tuner 30 may be for supporting tuning of satellite signals in accordance with a given satellite standard such as DVB-S/S2 or DSS. In different implementations, these front end tuners may be separate integrated circuits each including a single semiconductor die. In other embodiments one or more of the tuners may be formed using discrete components such as a so-called can tuner.

As seen in FIG. 1, various signals may be provided from the tuners to a demodulator 40, which may be a multi-standard demodulator in accordance with an embodiment of the present invention. In the implementation of FIG. 1, signals provided from first tuner 20 may include a differential signal pair of analog signals which may be downconverted signals at a given intermediate frequency (IF). As seen, these signals may be provided to an analog-to-digital converter (ADC) 45 of demodulator 40. Additional signals may be routed from tuner 20 to demodulator 40, including a signal indicating received signal strength (RSSI) which in turn may be provided to a separate ADC 48. Additionally, serial communication may occur to and from tuner 20, e.g., via serial lines, namely a serial data line (SDA) and a serial clock line (SCL), coupled to an $I^2C$ switch 50. Various communications from a host, e.g., a main processor of system 10, may be provided through demodulator 40 and to a given one of tuners 20 or 30 via these serial lines.

Similar downconverted signals may be provided from second tuner 30 to demodulator 40. More specifically, differential complex signals, namely downconverted I and Q signals which may be at an intermediate frequency or at a zero intermediate frequency (ZIF), may be provided to a dual ADC 60. As further seen in FIG. 1, various control signals, e.g., provided by a DiSCEqC™ interface 65 may be provided, e.g., to a satellite antenna (not shown in FIG. 1) that may provide the input signal to second tuner 30.

Demodulator 40 may process the incoming signals to demodulate the signals and generate a transport stream that can be output to a downstream device such as a MPEG processor for further processing. Note that while shown as three different components in the embodiment of FIG. 1, in other implementations a single component may include one or more tuners and the multi-standard demodulator. For example, in one implementation a single integrated circuit including one semiconductor die can include at least one front end tuner and the multi-standard demodulator. Further, while in many implementations both the demodulator and the tuners may be configured to handle only digital signal receipt and processing, in other implementations a system may also provide for tuning and processing of analog signals, either by way of the same tuners and demodulator or separate components within the system.

Figure 2:
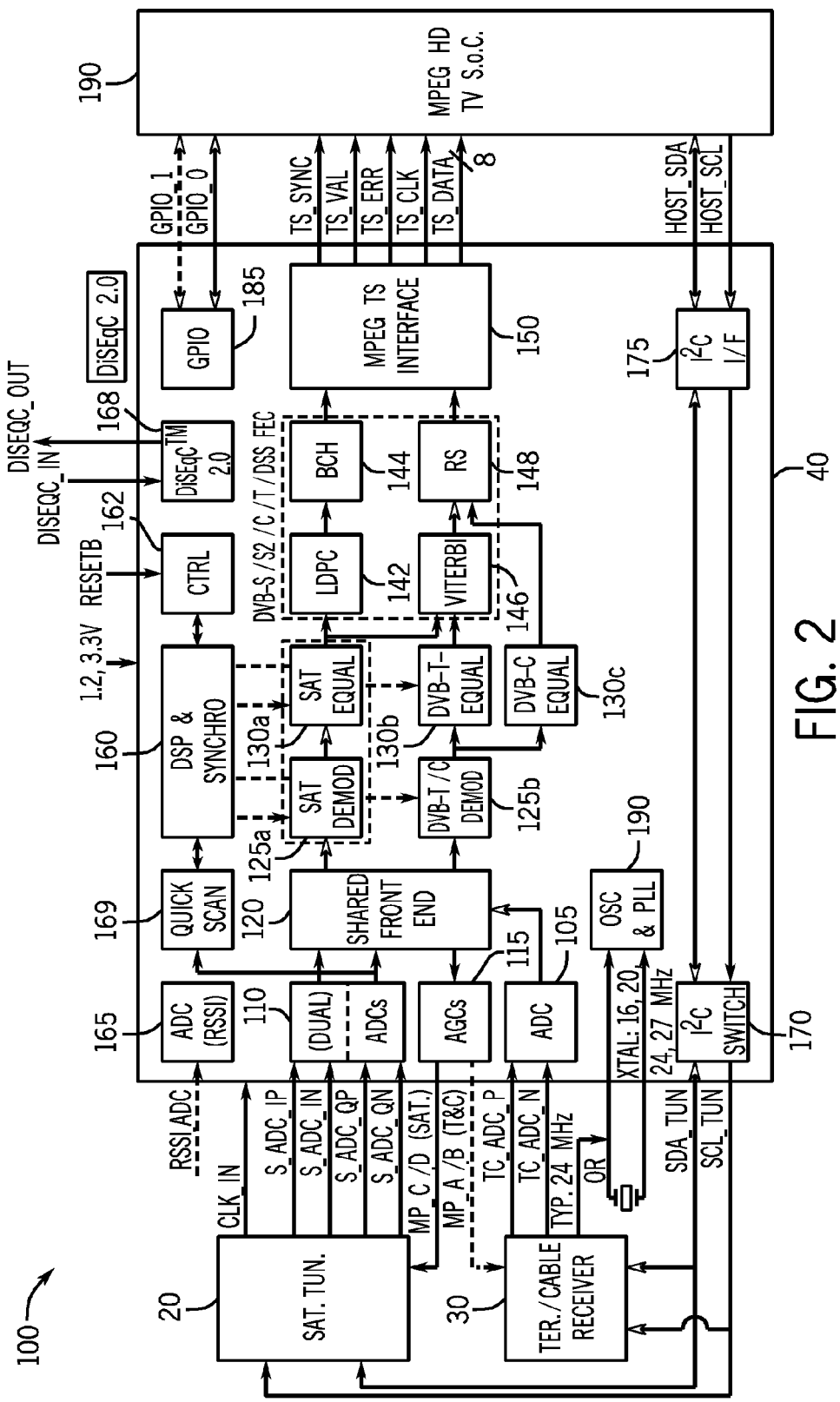
FIG. 2 is a block diagram of a multi-standard demodulator in accordance with an embodiment of the present invention.

Referring now to FIG. 2, shown are further details of a demodulator in accordance with an embodiment of the present invention. Specifically, FIG. 2 shows a system 100 that further includes a system-on-a-chip (SoC) 190 that may be coupled to receive an output transport stream from demodulator 40. Such SoC may be used to perform MPEG decoding to thus generate audio and video signals to be output to a display of system 100 (not shown in FIG. 2).

FIG. 2 further shows the general signal processing path for the incoming signals, both for satellite-received signals and cable/terrestrial-received signals. In various embodiments, much sharing of components of the signal processing path may occur to thus reduce chip real estate. In this way, demodulator 40 may be fabricated on a single die with a minimum amount of real estate consumed. That is, rather than having independent (i.e., dedicated) signal processing paths for multiple different standards that are adapted on either a single die or multiple dies, many of the components can be shared to provide as many opportunities for re-use for different standards as possible.

Specifically as seen in FIG. 2, incoming satellite signals are provided through ADCs 110 to a shared front end 120. This shared front end 120 may further be configured to handle incoming cable or terrestrial signals received through ADC 105. In other embodiments dual ADCs may provide further receipt of any type of DVB signal. Details regarding the shared front end are discussed further below. Thus a single front end is provided to perform various signal processing on incoming signals, which may be at a given IF, to filter and downconvert them to baseband signals. Incoming satellite signals are also provided through ADCs 110 to a Quickscan hardware accelerator. The Quickscan hardware accelerator first performs a FFT based linear spectrum analysis of the time-domain signal (after the dual ADCs) to provide raw estimates of the channel frequencies and symbol rates. The results of the linear spectrum analysis are then fed to FFT analysis of non-linear forms of the same time-domain signal which allow refining the raw estimates. Further the refined channel frequencies and symbol rates are fed to the demodulator to confirm the validity of the search results.

With regard to a signal processing path for satellite signals, the processed signals from shared front end 120 may be provided to a satellite demodulator $125_a$ which in various embodiments may include QPSK and 8PSK demodulators to handle a given DVB-S/S2 standard and DSS standard. Demodulation may be performed under control of a digital signal processor (DSP)/synchronizer 160 as will be discussed further below. The demodulated signals are then provided to a satellite equalizer $130_a$ for performing channel corrections. Depending on the given standard (e.g., DVB-S or DVB-S2) the equalized signals may be provided to different portions of a forward error correction (FEC) circuit 140. Specifically, a first path may include a Viterbi decoder 146 and a Reed-Solomon (RS) decoder 148, which may be used to handle decoding of, e.g., DVB-S and DSS signals. If instead the incoming information is of the DVB-S2 standard, the equalized signals from equalizer $130_a$ may be provided to a low density parity checker (LDPC) decoder 142 and BCH decoder 144. The LDPC and BCH decoders may provide for improved broadcast reception while limiting the size and power consumption of the demodulator. The decoded transport stream may be provided to a MPEG transport stream interface 150 that in turn outputs various transport stream information to SoC 190. The transport stream interface may be programmable to provide a flexible range of output modes and is fully compatible with any MPEG decoder or conditional access modules to support any back-end decoding chip.

For incoming terrestrial or cable signals from shared front end 120, these signals are provided to a second demodulator $125_b$, then to a second equalizer $130_b$ for terrestrial, or a third equalizer $130_c$ for cable then onto shared FEC circuit 140. Equalized terrestrial signals may be decoded using Viterbi decoder 146 and Reed-Solomon decoder 148 while equalized cable signals may be decoded using Reed-Solomon decoder 148 before being output through MPEG transport stream interface 150. Note that the circuitry of the signal processing paths may be dedicated hardware, in contrast to generic processing hardware such as present in DSP 160.

Various other circuitry may be present within demodulator 40, including, for example, a RSSI ADC 165, automatic gain control circuitry 115 which may, based on signal strength information, send various control signals to control gain elements of tuners 20 and 30. Additional interfaces include a DiSEgC™ interface 168 for satellite dish control, a control interface 162 which may receive an incoming reset signal and which is in communication with DSP/synchronizer 160. In addition, various general-purpose IO signals may be communicated via a general-purpose IO interface 185. I²C communication may be via an I²C switch 170 and an I²C interface 175. Various control and clock signals needed may be generated using an oscillator/phase lock loop 190 which may be coupled to, e.g., an off-chip crystal or other clock source. While shown with this particular implementation in the embodiment of FIG. 2, the scope of the present invention is not limited in this regard.

As such, demodulator 40 may integrate into a single CMOS chip DVB-T, DVB-C, DSS, DVB-S, and DVB-S2 digital demodulators for, respectively, terrestrial, cable, and satellite DTV standards, and may achieve high reception performance for each media while minimizing front-end design complexity and cost. In one embodiment, the terrestrial and cable demodulation can support either standard IF (36 MHz) or low-IF input signals, ACI rejection filter, long and short echo management, impulsive noise reduction, fast scan, and an advanced equalizer.

The satellite functionality allows demodulating widely deployed DVB-S, DirecTV™ (DSS) legacy standards, and next generation DVB-S2 satellite broadcasts (e.g., HD or SD), and AMC mode DirecTV™, in one embodiment. A ZIF interface for satellite signals with two high-speed ADCs 110 allows for a seamless connection to 8PSK-compliant silicon tuners. Constant coding modulation (CCM), QPSK/8PSK (with pilots) demodulation schemes and broadcast profile are the main specifications of the DVB-S2 demodulator.

Figure 3:
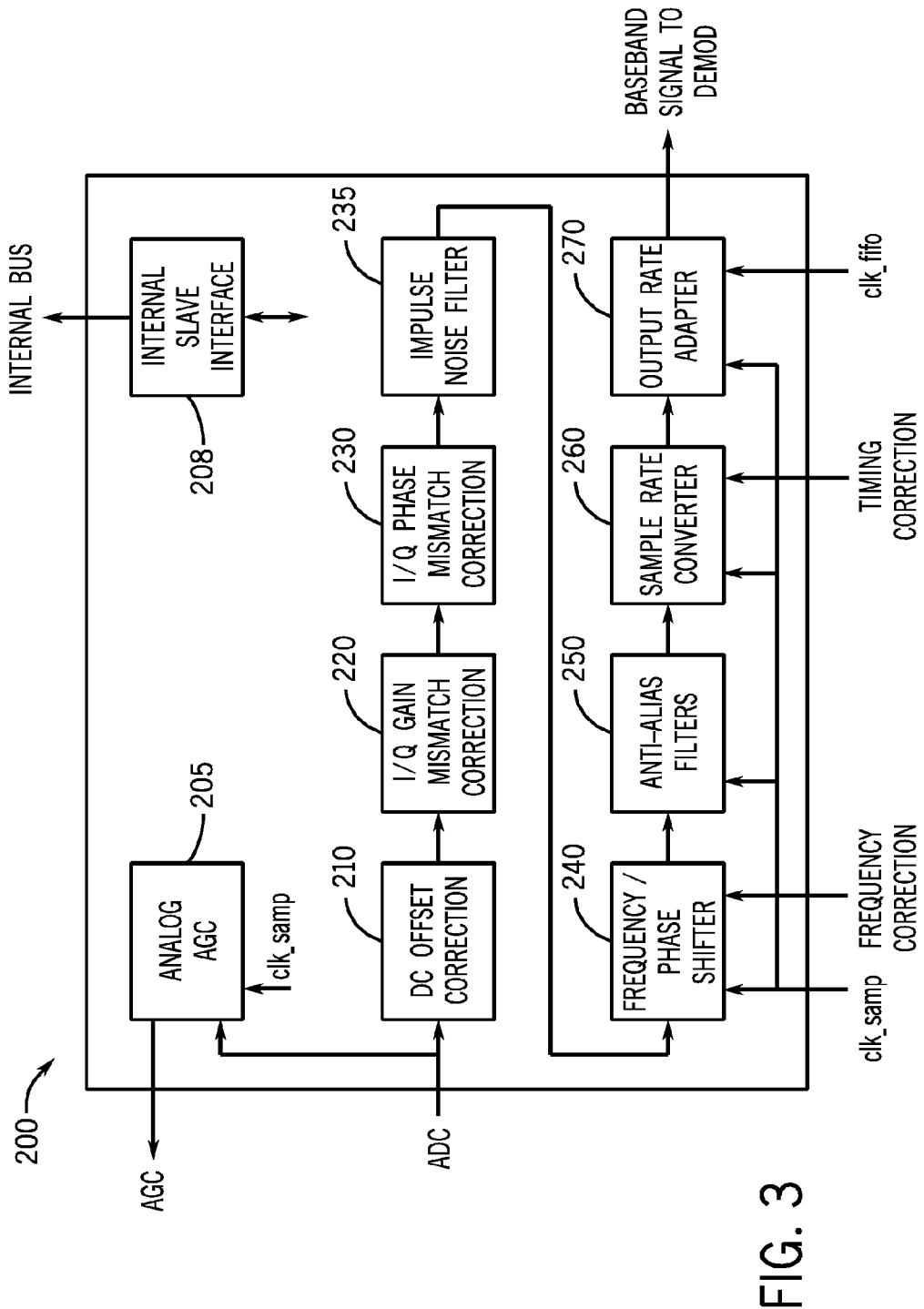
FIG. 3 is a block diagram of a shared front end circuit in accordance with one embodiment of the present invention.

Referring now to FIG. 3, shown is a block diagram of a shared front end circuit in accordance with one embodiment of the present invention. Shared front end circuit 200 may be used to handle front end processing for incoming signals of any given standard. As discussed above the incoming signals may be received at an IF or ZIF frequency. The input of shared front end 200 is a very flexible ZIF or IF interface, digitally converted. The IF values can range from a few MHz up to 60 MHz, so that it can directly interface with all existing tuner technologies. The IF can be either over-sampled or sub-sampled, depending on the application. In various embodiments, the sampling frequency can be set to be greater than 2 or 4 times the maximum symbol rate, depending on the selected standard.

The incoming signals may be provided from a given ADC and coupled to an analog AGC circuit 205, which may be used to provide control signals to front end tuner components. Thus the signal is sent to AGC circuit 205, which estimates input power, compares it to a selected reference and generates two AGC commands (one for RF, one for IF) in order to adjust ADC input levels. In one embodiment, AGC outputs are delta-sigma encoded signals, so that the analog command voltage can be obtained through simple RC filters. Many loop parameters can be programmable through an internal interface 208 (which couples via an internal bus to both the I²C Host interface 175 and the DSP processor 160 in order to setup and optimize the loops according to the external RF and IF circuitry (tuner cans, silicon tuners, and so forth)).

The main signal processing path of shared front end circuit 200 includes a DC offset correction circuit 210, an I/Q gain mismatch correction circuit 220, an I/Q phase mismatch correction circuit 230, and an impulse noise filter 235. The filtered signals from filter 230 may then be provided to a frequency/phase shifter 240 which may downconvert the signals to baseband. The downconverted signals may then be provided to one or more anti-alias filters 250, and from there via a sample rate converter 260 and an output rate adapter 270 to a selected demodulator, based on the type of signal.

In DC offset correction circuit 210, a DC offset correction is applied to the input signal and in case of ZIF applications, I/Q gain and phase mismatch correction may be performed via I/Q correction circuits 220 and 230. After down-conversion to baseband in frequency/phase shifter 240, the signal passes through anti-alias filters 250, which remove unwanted adjacent power, in order to avoid aliasing during the sampling rate conversion process. To cover the wide sampling frequency range, two anti-alias filters may be provided and are automatically selected depending on the ratio between the sampling frequency and the symbol rate. An automatic digital gain control is also performed at the anti-aliasing filter output, to compensate for power removal in the filters, so that output signal power is optimum.

Then, an interpolation in sample rate converter 260 using correction information coming from a synchronizer or demodulator allows converting the sampling rate of the signal to a fixed ratio, e.g., 2 or 4 times the symbol rate. From this stage of the datapath, only a clock with a frequency greater than, e.g., 2 or 4 times the maximum required symbol rate is needed. As such, a clock rate adaptation may be performed in output rate adapter 270 in order not to place unnecessary timing constraints on following blocks.

Figure 4:
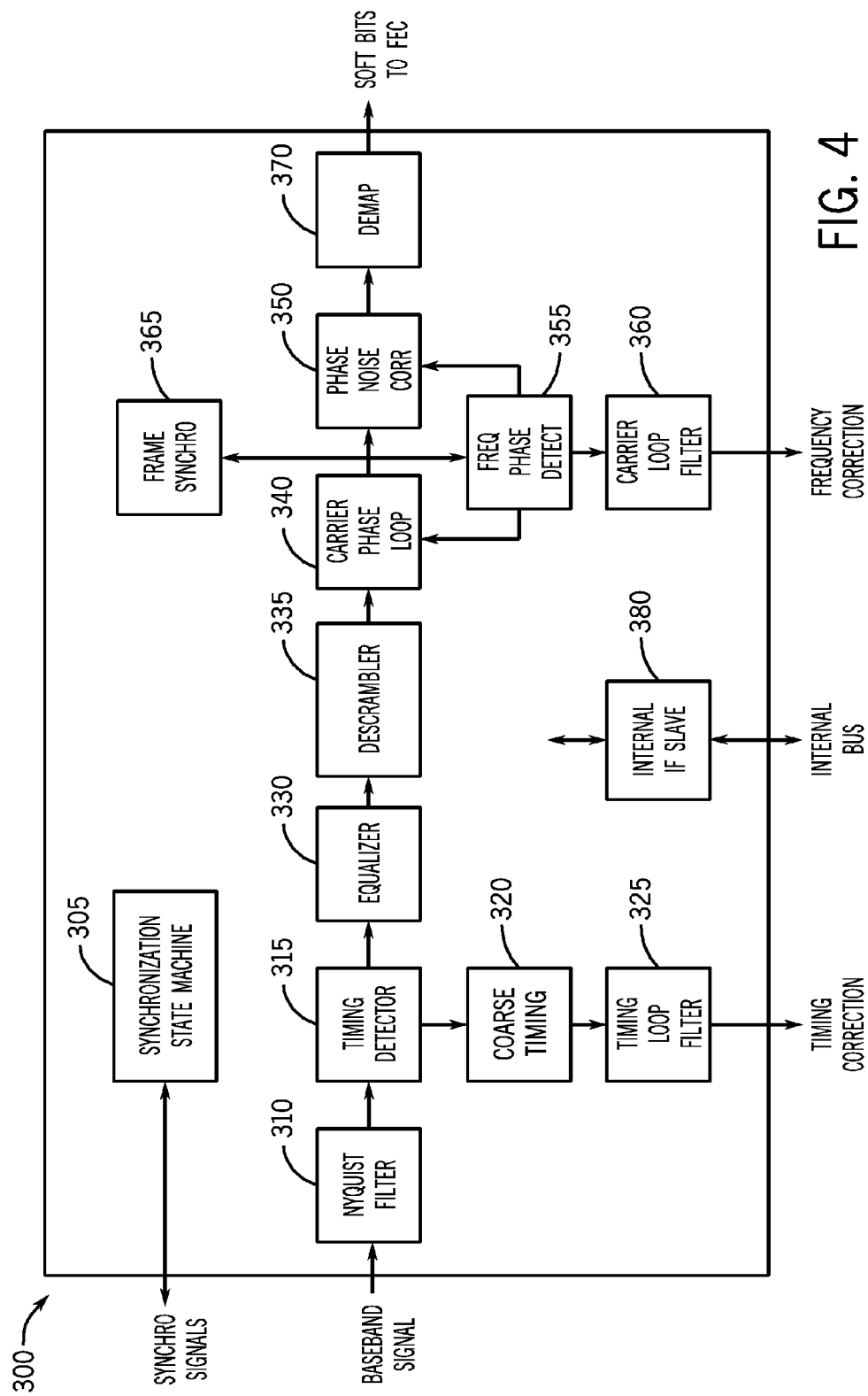
FIG. 4 is a block diagram of a shared demodulator and equalizer for satellite signals in accordance with an embodiment of the present invention.

Referring now to FIG. 4, shown is a block diagram of a shared demodulator and equalizer for satellite signals in accordance with an embodiment of the present invention. As seen in FIG. 4, the signal path of demodulator 300 includes various circuits to receive incoming baseband signals and to output demodulated signals, which may be in the form of soft decisions or soft bits that in turn may be provided to a given FEC circuit, depending on the type of satellite signal.

As seen, the main signal processing path of demodulator 300 includes a Nyquist filter 310, the output of which is coupled to a timing detector 315 and which provides information to a coarse timing circuit 320 that in turn is coupled to a timing loop filter 325 that outputs a timing correction signal, as discussed further below. The main signal processing path further includes an equalizer 330, a descrambler 335, a carrier phase loop 340, a phase noise correction circuit 350 and a demapper 370, which outputs soft bit decisions to the FEC circuit.

As further seen in FIG. 4, a frequency/phase detector 355 is coupled to phase loop 340 and phase noise corrector 350 and is further coupled to a carrier loop filter 360 which provides a frequency correction, also discussed further below. Frequency/phase detector 355 is further coupled to a frame synchronizer 365. Various synchronization signals may be output from a synchronization state machine 305 back to circuitry of the shared front end. In addition, an internal slave interface 380 may provide communications used for controlling parameters of the components of demodulator 300.

In operation, satellite demodulator 300 may work as follows. Baseband signals coming from the shared front end are filtered and then decimated in a high rejection half-Nyquist filter 310 to provide PSK symbols to equalizer 330. An automatic digital gain control is also performed at the Nyquist filter output, to compensate for power removal in the filter, so that the output signal power is optimum. Timing error detector 315 provides an error to a second order loop filter 325, which delivers a timing correction signal to control sampling rate converter 260 of shared front end circuit 200. Bandwidth and damping factor of the loop can be programmable in order to achieve both a high acquisition range and good performance during tracking phase.

Note that coarse timing circuit 320 is usually used only in scanning mode, to estimate the symbol rate of the input signal. It may implement an algorithm to enlarge the timing acquisition range to a few tens of the symbol rate, which largely speeds up the scanning procedure. A highly programmable carrier frequency recovery function is provided in order to cope with large frequency offsets. The frequency correction signal is sent back to the down-converter 240 of shared front end circuit 200, which applies the frequency shift on the input spectrum.

A highly programmable carrier phase recovery function is provided in phase loop 340 to cope with all the different modes of the DVB-S2 standard and phase noise correction circuit 350 helps to reduce the effect of tuner and LNB phase noise in pilot modes. Demapper 370 receives the demodulated symbols and generates soft decision information for the FEC block. Frame synchronization can be performed via frame synchronizer 365 using correlation on the PLHEADER sequence of the DVB-S2 received signal, and the overall synchronization process of the DVB-S2 demodulator can be controlled by configurable state machine 305, which uses status information from the different blocks to sequence the synchronization algorithms, allowing the synchronization to be completely autonomous and making the required software very simple.

Figure 5:
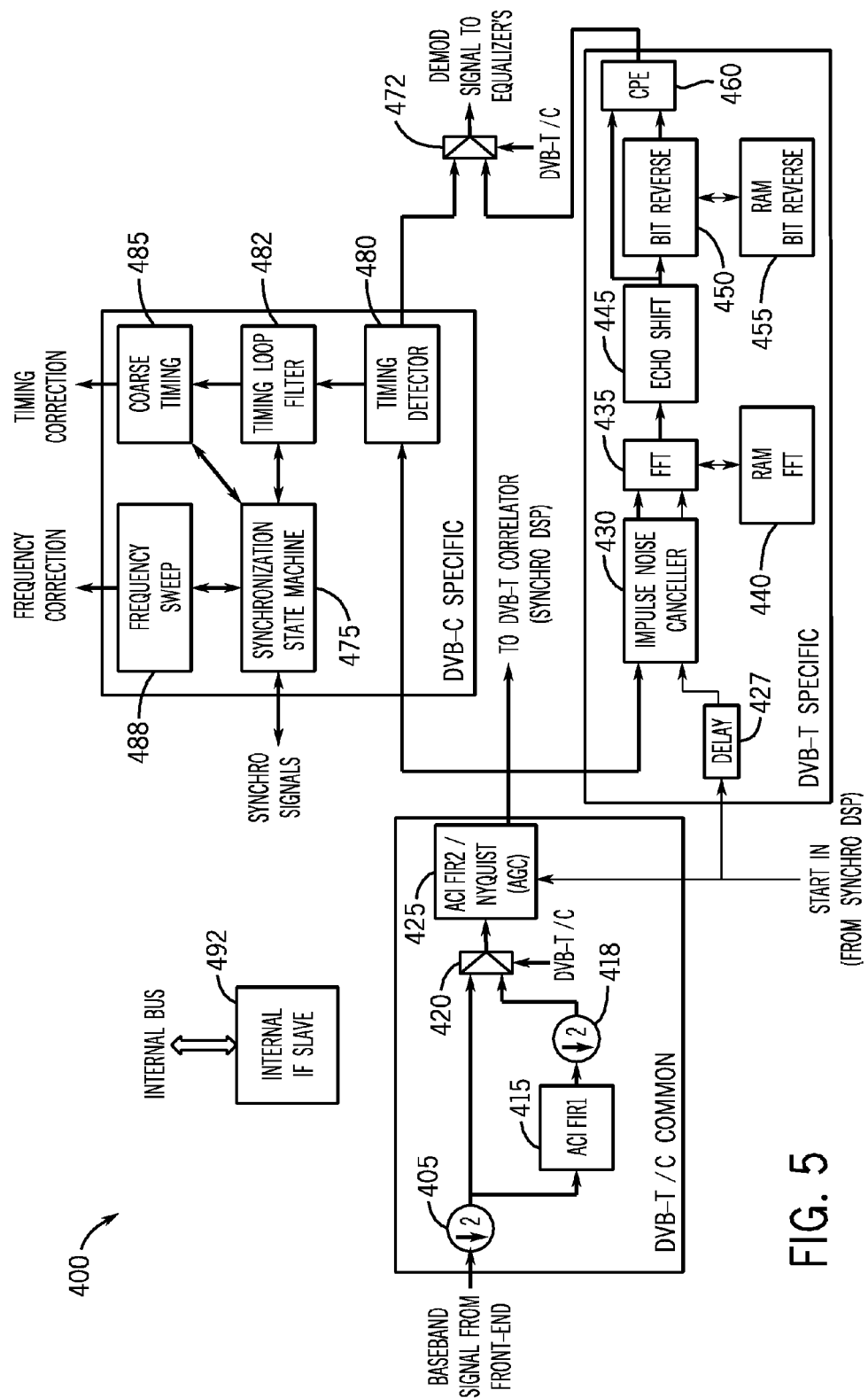
FIG. 5 is a block diagram of a shared demodulator that may be used to handle both cable and terrestrial signals in accordance with one embodiment of the present invention.

Referring now to FIG. 5, shown is a block diagram of a shared demodulator 400 that may be used to handle both cable and terrestrial signals. As seen, certain blocks are shared, while some dedicated circuitry exists for the specific signal types. In FIG. 5, incoming signals which may be complex I/Q signals may first be provided to a decimator 405, the output of which is provided to a multiplexer 420 and to terrestrial-specific circuitry 410. Multiplexer 420 may be under control of a control signal that selects one of two inputs to multiplexer 420 depending on whether the incoming signal is a cable signal or a terrestrial signal. If a cable signal, the output of decimator 405 may be output by multiplexer 420 to an adjacent channel interference (ACI) finite impulse response (FIR)/Nyquist filter 425. If instead the signal is a terrestrial signal, a second input to multiplexer 420, received after some processing in terrestrial-specific circuitry 400, is selected. As seen, before input to multiplexer 420, the signal is filtered in another ACI/FIR filter 415 and again decimated in decimator 418.

Terrestrial-specific circuitry 410 further includes a delay block 427, an impulse noise canceller 430, which receives the output of filter 425 and operates to cancel impulse noise. The noise-cancelled signal is provided to a fast Fourier transform (FFT) engine 435 which is coupled to FFT storage 440. The output OFDM signals are provided to an echo shifter 445 that in turn is coupled to a bit reverser 450 and which is also coupled to a common phase error (CPE) corrector 460, which in turn provides a demodulated terrestrial signal to a second multiplexer 472.

Cable signals instead are provided from filter 425 to cable-specific circuitry 470 which includes a timing detector 480, a timing loop filter 482, and a coarse timing circuit 485. Control of this circuitry may be via a synchronization state machine 475 that in turn is coupled to a frequency sweeper 488. Additional circuitry present in demodulator 400 may include an internal slave interface 490.

Thus the terrestrial and cable demodulator 400 is composed of DVB-T specific functions, DVB-C specific functions and shared central filter 425 for performing the ACI filtering in DVB-T mode and half-Nyquist matched filtering in DVB-C mode.

In DVB-T mode, a baseband signal coming from shared front end circuit 200 is filtered through two ACI filters (415 and 425), assuming the rejection of the residual adjacent energy not fully rejected by shared front end circuit 200. An automatic digital gain control is performed at the output of second ACT filter 425, to compensate for power removal in this filter, so that output signal power at the FFT input is optimum. The signal is then fed to the impulse noise canceller 430 whose aim is to mitigate the effects of various impulse perturbations.

FFT processing (e.g., 8k/4K/2K) is then performed in FFT engine 435 to convert the DVB-T signal into the frequency domain. Note that the FFT provides an OFDM symbol in bit-reverse order. Before being output to a DVB-T equalizer, the signal is further processed. The signal is first fed to the echo shifter 445 which compensates the discontinuities caused by any jump of the FFT window. These discontinuities are compensated to enable the downstream equalizer to estimate properly the channel response. The signal is then fed to bit reverser 450 which reorders the OFDM symbol. Then the signal is fed to CPE correction circuit 460 which compensates for the low-frequency component of phase noise. The CPE block uses the continual pilots at the output of the echo shift block to estimate the phase rotation between two consecutive OFDM symbols and performs phase correction on the delayed OFDM symbol provided by bit reverser 450. Consequently CPE circuit 460 does not require an additional RAM to delay the OFDM symbols but takes benefit of the bit-reverse RAM 455.

The FFT window positioning can be provided by the synchronizer (which may be part of DSP 160 of FIG. 2). This signal is used by the ACI filter 425 in order to update its downstream AGC command. In parallel, the FFT start signal is delayed by delay 427 and impulse noise canceller 430 to prevent the AGC update occurring during the useful part of the OFDM symbol. The output of the second filter 425 is also output and provided to a correlation processor, which may be located in the synchronizer.

In DVB-C mode, a baseband signal coming from shared front end circuit 200 is decimated by 2, filtered through a high rejection half-Nyquist filter 425 and then decimated again to provide QAM symbols to the equalizer. An automatic digital gain control is also performed at the Nyquist filter output, to compensate for power removal in the filter, so that output signal power is optimum.

Timing error detector 480 provides an error signal to second-order loop filter 482, which delivers a timing correction signal to control sampling rate converter 260 in shared front end circuit 200. Bandwidth and damping factor of the loop can be programmable in order to achieve both a high acquisition range and good performance during tracking phase. Note that coarse timing circuit 485 is usually used only in scanning mode, to estimate the symbol rate of input signal. It can implement an algorithm to enlarge the timing acquisition range to few tens of the symbol rate, which largely speeds up the scanning procedure.

A highly programmable frequency sweep function in frequency sequencer 488 is provided in order to cope with large frequency offsets. The frequency correction signal is sent back to down-converter 240 of shared front end circuit 200, which applies the frequency shift on the input spectrum. The overall synchronization process of the QAM demodulator is controlled by a configurable state machine 475, which uses status information from the different blocks to sequence the synchronization algorithms. This makes the synchronization completely autonomous and therefore makes the required software very simple.

Figure 6:
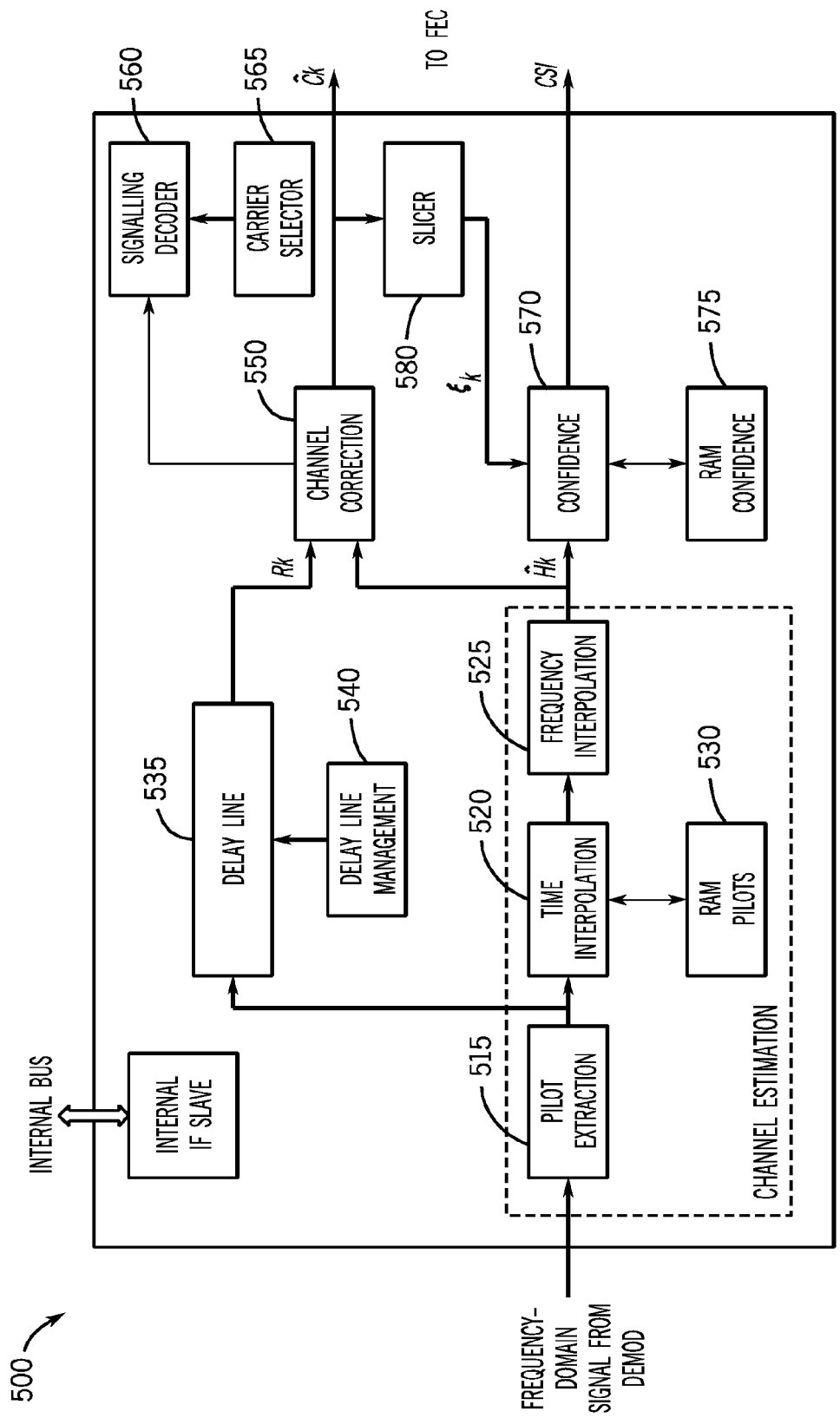
FIG. 6 is a block diagram of a terrestrial equalizer in accordance with one embodiment of the present invention.

Referring now to FIG. 6, shown is a block diagram for a terrestrial equalizer in accordance with one embodiment of the present invention. As shown in FIG. 5, equalizer 500 may receive the OFDM symbols from, e.g., demodulator 400. As seen, equalizer 500 includes a channel estimator 510, a delay line 535, a channel correction circuit 550, a slicer 580, and a confidence generator 570. Thus the output from the equalizer 500 may include a frequency domain channel estimation, i.e., $\hat{C}_K$, along with a confidence decision corresponding to channel state information (CSI).

More specifically, channel estimator 510 may include a pilot extraction circuit 515, a time interpolator 520 which is coupled to a pilot storage 530 and a frequency interpolator 525. Pilot extraction circuit 515 is the first step of the channel estimation. The aim of this block is to extract from the OFDM symbols scattered pilots which will be used for the interpolation process. In turn, time interpolator 520 is the second step of the global channel estimation, and seeks to interpolate between the scattered pilots along the time axis. At the output of the timing interpolator 520, the entire scattered carriers are fully estimated. Then frequency interpolating in frequency interpolator 525 completes the channel estimation process. At the output of the time interpolator, only the scattered carriers are estimated. The aim of frequency interpolation is to complete the interpolation along the frequency axis. After this block, the channel response is globally estimated in the frequency domain and a single tap channel correction can be performed on the incoming QAM symbols. A delay line manager 540 may be coupled to delay line 535. The delay line manager controls concurrent accesses to the delay line memory. In one embodiment, write access occurs when a QAM symbol is provided by the demodulator block and read access occurs during the channel correction operation.

As seen, channel correction circuit 550 receives a delayed (and potentially distorted) symbol $R_K$ and the frequency interpolated value $\hat{H}_K$ (i.e., the channel estimate) to generate a symbol estimate (and which in one embodiment may be a QAM symbol), which is also provided to a signaling decoder 560 that in turn is coupled a carrier selector 565. In general, channel correction circuit 550 may perform the following computation:

$$\hat{C}k = \frac{Rk}{\hat{H}k}.$$

The signaling decoder 560 extracts from the OFDM symbol all the signaling information, and assumes the demodulation of these special carriers. Each OFDM symbol carries one signaling bit. So at the end of each symbol, this signaling bit decoded is available via a register. An entire signaling sequence (e.g., 68 bits) may be obtained to check the BCH code in order to extract all the transmission parameters. In turn, the carrier selector may select the different types of carriers inside the OFDM symbols. In one embodiment, the carriers are classified in five categories: continual carriers, scattered carriers, payload carriers, signaling carriers and auxiliary carriers.

Slicer 580 may generate an error signal ($\xi_K$) on each symbol that is provided to a confidence circuit 570 that in turn is coupled to a confidence storage 575. The SNR computed on each subcarrier over one OFDM symbol is not uniform for two main reasons: each subcarrier can be affected differently by noise/disturbance (e.g., CCI, ACI, analog-to-digital interference), which vary across frequency; and frequency selective fading causes the received signal power of some subcarriers to be much lower than others. The confidence computation in confidence circuit 570 thus evaluates the SNR on each subcarrier and provides channel state information (CSI) to a demapper (not shown in FIG. 6) in order to weight the soft bits before feeding them to the Viterbi decoder. In one embodiment, there may be two modes of confidence computation: pure fading mode (csi_mode=fading), in which only the channel estimation is used to compute the CSI: $CSI=|\hat{H}_K|^2$; and CCI mode (csi_mode=cci) in which both CCI and fading are taken into account.

$$CSI = \frac{|\hat{H}_K|^2 * \sigma^2}{\sigma_k^2},$$

where $\sigma^2$ is the mean noise power computed over the OFDM symbol and $\sigma_k^2$ is the noise power of subcarrier k.

Thus the equalization in OFDM systems is performed in the frequency domain and is reduced to its simplest expression: a single tap equalizer. The inputs to equalizer 500 are the OFDM symbols in the frequency domain. In order to equalize each carrier, equalizer 500 estimates the frequency response of the channel. This task is facilitated by the insertion of scattered and continuous pilots at specific frequencies at the transmission side. These pilots are modulated and boosted to ensure better reception. The equalizer has first to demodulate them and then can estimate the channel response thanks to a two step interpolation scheme. First a time interpolation is applied to estimate the channel response in the time direction. Several algorithms may be provided for the timing interpolation. The time interpolator output is fed to frequency interpolator 525, which completes the channel estimation in the frequency direction. Then a one tap equalizer is used to straighten the distorted carriers.

Concurrently, the channel estimation and the symbol errors coming from slicer 580 are used to compute channel state information (CSI). The CSI can thus take into consideration the mean noise power on each carrier in order to deal with high level co-channel interferences. As such, both estimated $\hat{C}_K$ and CSI are output and are processed by a demapper located in a shared FEC circuit as described below.

Figure 7:
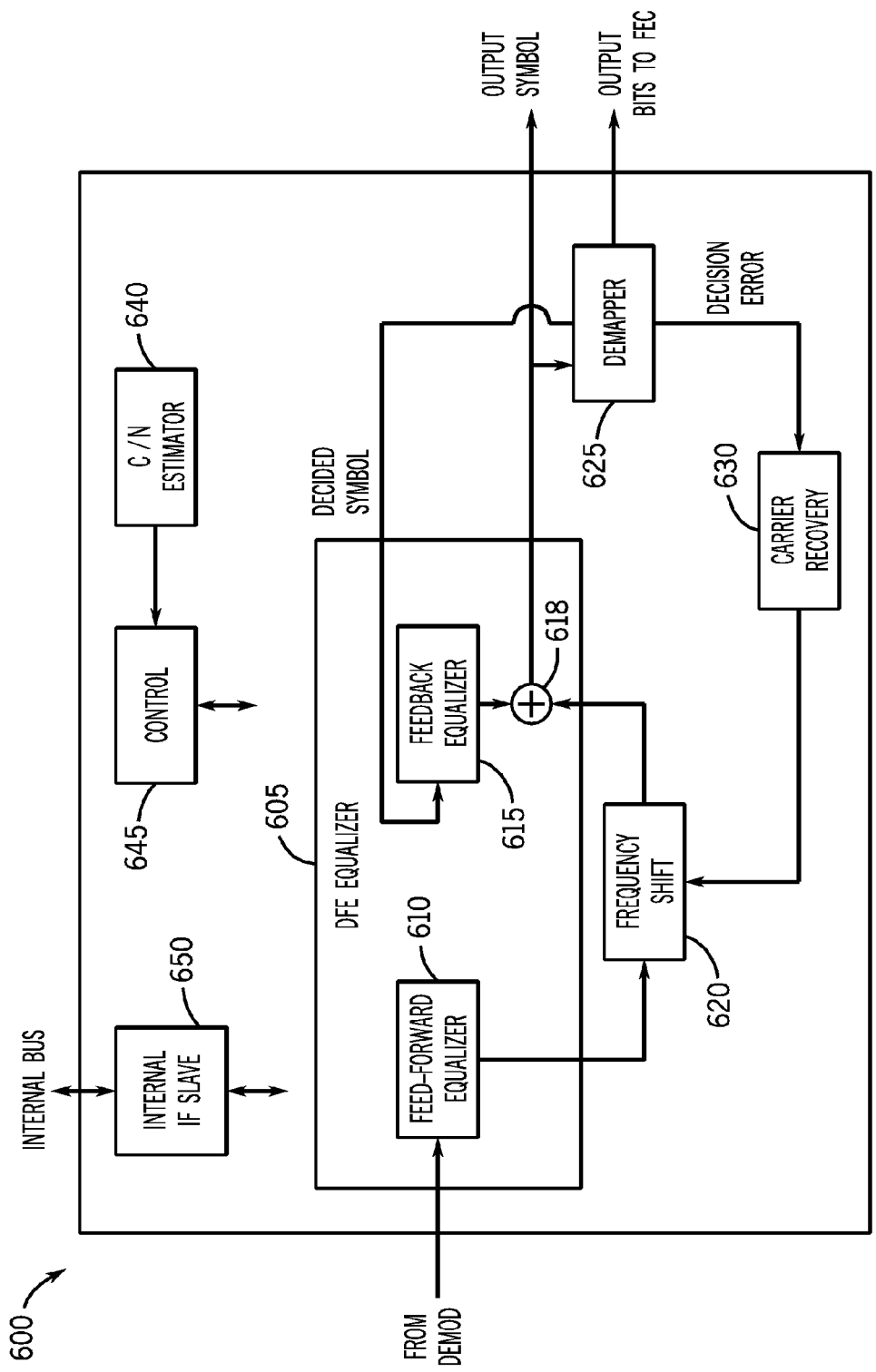
FIG. 7 is a block diagram of a cable equalizer in accordance with one embodiment of the present invention.

Referring now to FIG. 7, shown is a block diagram of a cable equalizer in accordance with one embodiment of the present invention. As shown in FIG. 7, equalizer 600 may receive incoming input symbols from the cable demodulator and provide them to a decision feedback equalizer 605 which generates output symbols and provides them to forward error correction circuitry in addition to a demapper 625. The demapper which supports programmable constellation amplitude receives noisy symbols and generates hard decision bits for the FEC circuit. As seen, a feed forward equalizer 610 may be coupled to a frequency shifter 620 that in turn is controlled by a carrier recovery circuit 630 that receives a decision error from demapper 625. The output of frequency shifter 620 is in turn coupled to a summer 618, along with the output of feedback equalizer 615. A channel-to-noise estimator 640 and a controller 645 may be used to control automatically parameters of both equalizer and carrier recovery during the acquisition and tracking phases. As further seen, an internal bus interface 650 may provide for communication of control information via the internal bus.

Thus as seen, cable equalizer 600 implements an adaptive decision-feedback equalizer, a carrier recovery loop, and a demapper suitable for a DTV-C standard. In general DFE equalizer 605 is composed of two parts: feed-forward equalizer 610 having a programmable length which receives symbols at the symbol rate from the demodulator; and feedback equalizer 615 which receives decided symbols from demapper 625. The coefficient adaptation is based on a gradient algorithm that seeks to minimize the mean square error (MSE) at the equalizer output by adapting recursively the coefficients.

Carrier recovery circuit 630 implements a phase detector and a programmable second-order loop filter, and receives the decision error from demapper 625. The carrier phase is corrected at the feed-forward equalizer output via frequency shifter 620. The control of the equalizer and the carrier recovery during acquisition and tracking phases is performed by a dedicated state-machine controller 645 and C/N estimator 650.

Figure 8:
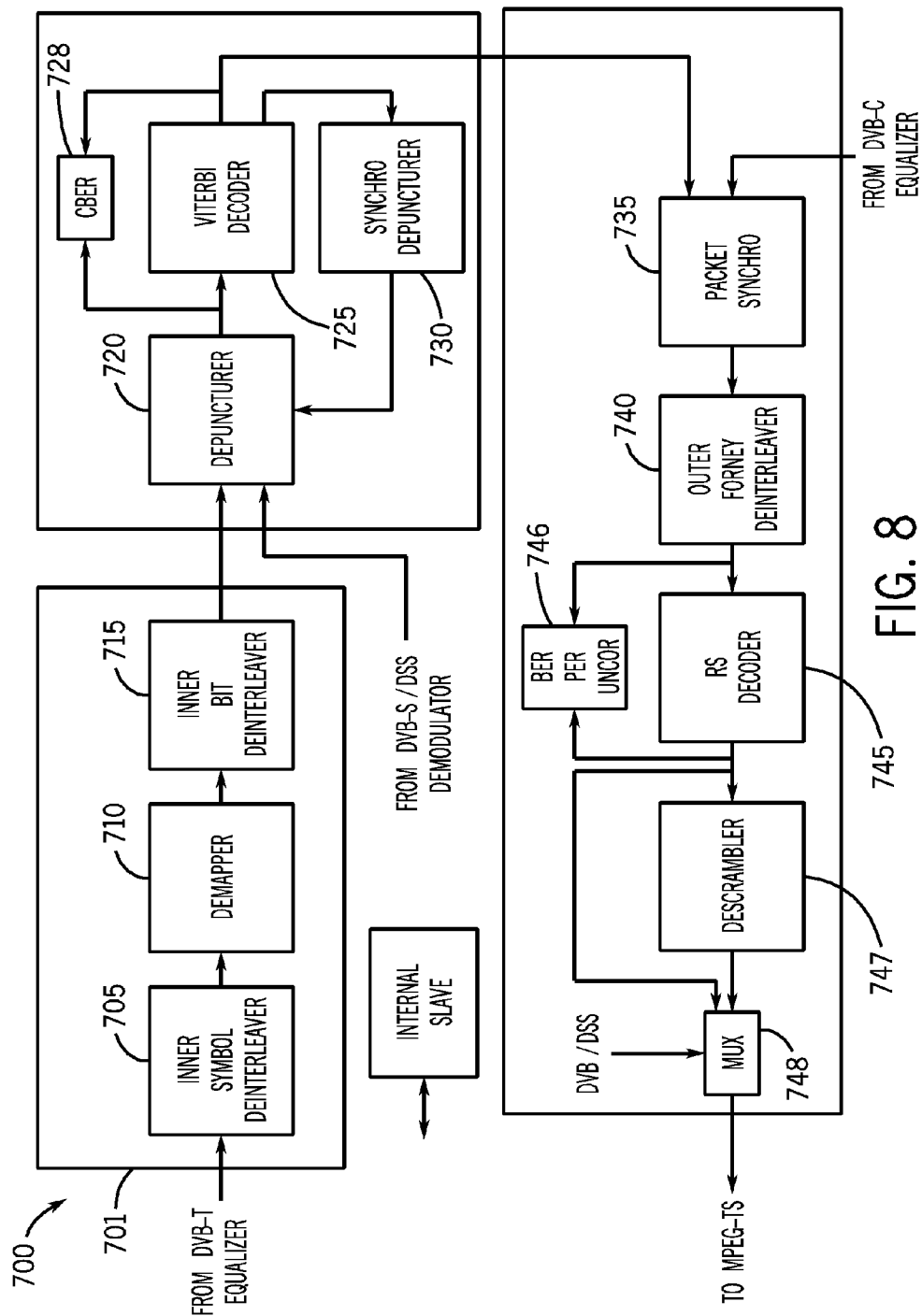
FIG. 8 is a block diagram of a shared forward error correction (FEC) circuit in accordance with one embodiment of the present invention.

Referring now to FIG. 8, shown is a block diagram of a shared FEC circuit in accordance with one embodiment of the present invention. As shown in FIG. 8, shared FEC circuit 700 may include a single path that can handle the various standards. To accommodate different processing needed for the different circuits, input to FEC circuitry 700 may be made at different stages of the FEC signal processing path via a plurality of input ports to account for differences in the different standards. As seen in FIG. 8, the signal processing path of circuit 700 may include a first input port coupled to a deinterleaver 701, which may include various blocks. As seen, deinterleaver 701 includes an inner symbol deinterleaver 705 that is coupled to receive terrestrial-equalized signals and which in turn is coupled to a demapper 710 and an inner bit deinterleaver 715. From there, the interleaved terrestrial signals, along with satellite-demodulated signals provided via a second input port may be provided to a depuncturer 720 having an output coupled to a Viterbi decoder 725. In addition, various bit error rate information may be determined in a channel bit error rate detector 728. A feedback loop may include a synchronization depuncturer 730 that is coupled from the output of decoder 725 to depuncturer 720.

As seen in FIG. 8, the decoded signals may be provided to a packet synchronizer 735, along with cable-equalized signals provided via a third input port. The synchronized signals are then provided to an outer Forney deinterleaver 740, and from there to an RS decoder 745 and a descrambler 747, if needed prior to output via a multiplexer 748. Note that various error correction information may be determined in block 746.

This shared FEC circuit 700 receives data streams from either the DVB-T or DVB-C equalizers or from the DVB-S/DSS demodulator. For DVB-T, the FEC first implements frequency deinterleaving of the incoming OFDM symbol. Deinterleaver 701 can be configured as native or in-depth, where the native mode is the original mode of the DVB-T specification and the in-depth mode is the specific mode from Annex F. Rate smoothing may be implemented to cancel the jitter effects of the OFDM symbol structure and of FFT window synchronization. Demapper 710 then computes soft decision bits from the frequency deinterleaved complex symbol and channel state information. Bit deinterleaving is then performed in bit deinterleaver 715 to achieve randomization at the bit stream level.

Viterbi decoder 725 first performs automatic depuncturing of the incoming stream, systematically synchronized to the start of the OFDM symbol in DVB-T, or by a synchronization state machine for DVB-S/DSS. Error correction is then performed with a trace-back decoding.

Packet synchronizer 735 provides DVB packets of 204 bytes or DSS packets of 146 bytes. In one embodiment, Forney deinterleaver 740 spreads the remaining burst errors after Viterbi decoding to allow their correction by the RS decoder 745. The capacity of the deinterleaver is configurable as Forney, I=12 and J=17 for DVB and Ramsey, I=146 and J=12 for DSS. The RS decoder 745, with correction capacity of t=8 bytes and packet lengths of N=146 bytes (DSS) or 204 bytes (DVB) will correct the residual errors after deinterleaving, and declare the output packet uncorrectable if its correction capacity is exceeded. Descrambling is then processed in descrambler 747, synchronized by the inverted SYNC byte 0xB8 of DVB, or is bypassed for DSS.

Figure 9:
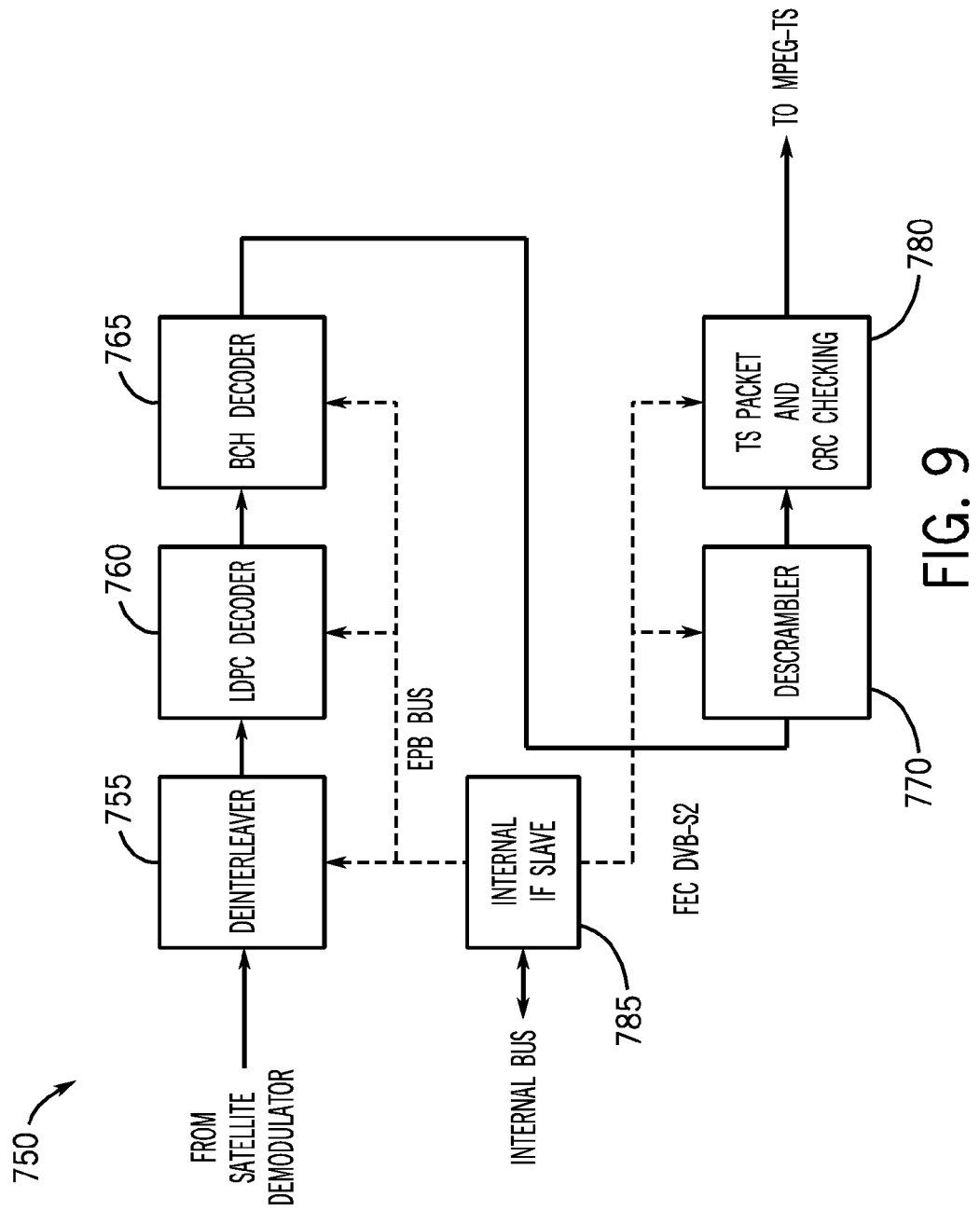
FIG. 9 is a block diagram of FEC circuitry for handling satellite signals in accordance with one embodiment of the present invention.

Referring now to FIG. 9, shown is a block diagram of FEC circuitry for handling satellite communications in accordance with a DVB-S2 standard in accordance with one embodiment of the present invention. Note of course that such FEC circuitry may be applicable to other standards either now existing or realized in the future. As seen in FIG. 9, FEC circuit 750 may receive satellite-demodulated signals and provide them to a signal processing path including a deinterleaver 755, a LDPC decoder 760, a BCH decoder 765, a descrambler 770, and a transport stream packet and CRC checking circuit 780.

The resulting MPEG transport stream may then be output to, e.g., an MPEG output interface.

As seen FEC circuit 750 receives soft decision bits from a satellite demapper (QPSK, 8PSK) of satellite demodulator 300. After proper deinterleaving in deinterleaver 755, it performs iterative decoding of frames of 64800 soft bits (normal frame) in LDPC decoder 760. The iterative decoding is based on a flexible semi-parallel architecture with configurable numbers of bit node processors and check nodes processors. The iteratively decoded bits are checked by BCH decoder 765, followed by descrambling in descrambler 770. Packet synchronization based on frame header information and CRC checking on a transport stream packet may be performed in block 780 to provide FEC packets to a transport stream interface.

Figure 10:
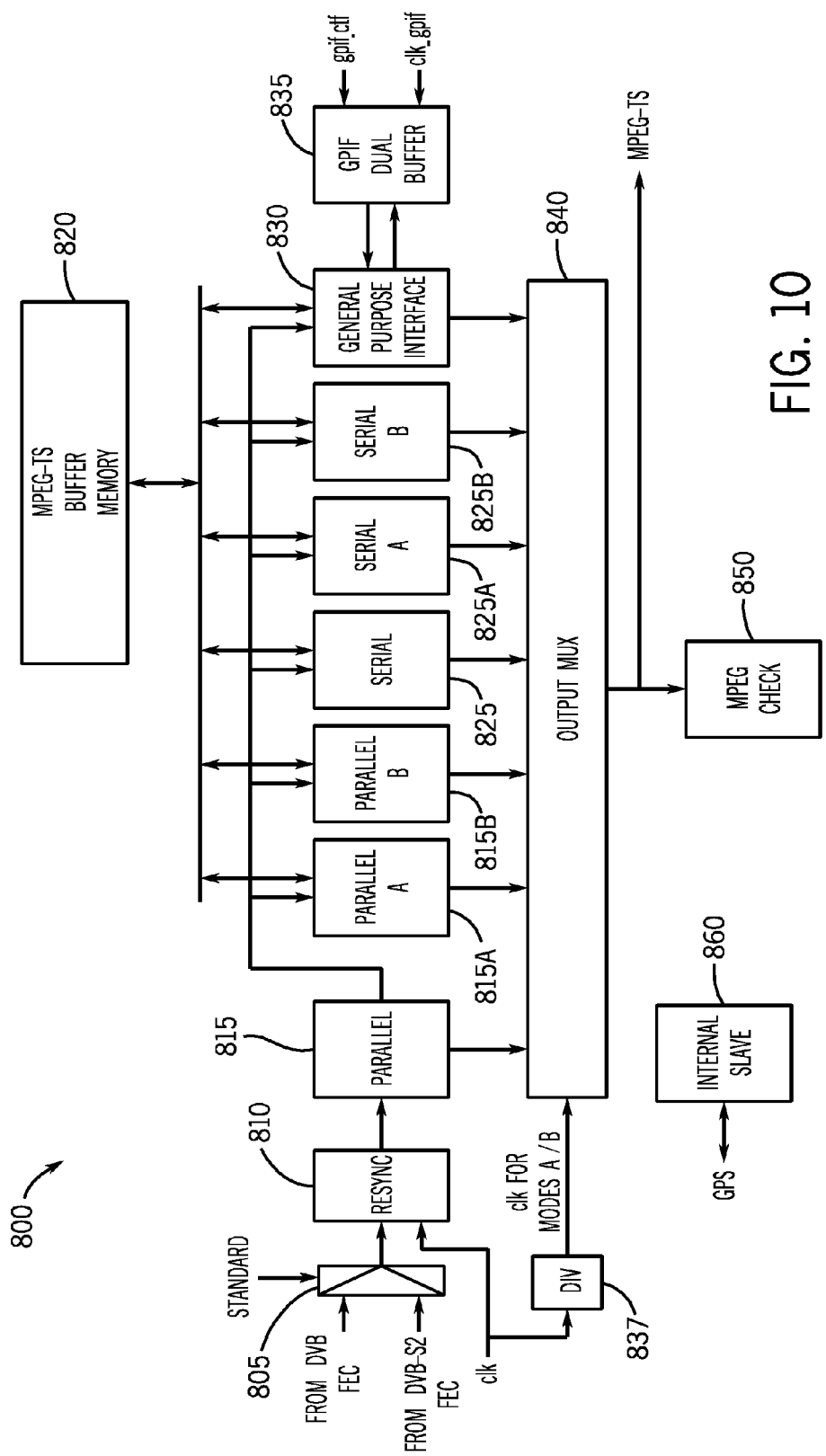
FIG. 10 is a block diagram of a transport stream output interface in accordance with an embodiment of the present invention.

Referring now to FIG. 10, shown is a block diagram of a transport stream output interface in accordance with an embodiment of the present invention. As shown in FIG. 10, output interface 800 may be used to receive incoming transport stream signals and process them accordingly for output, e.g., to a SoC or other processing circuitry. The inputs of the interface are the outputs of shared FEC circuit 700 (both DVB and DVB-S2 portions described as to FIGS. 8 and 9). To relax design and system constraints, the inputs to interface 800 can be considered asynchronous and are then resynchronized by the system clock used for the interface. As seen, the incoming FEC signals are provided through a multiplexer 805 and a resynchronizer 810 and provided to a parallelizer 815, which parallelizes the transport stream for output via one of multiple parallel interfaces $815_a$-$815_b$. Alternately, signals can be output via one of multiple serializers $825_a$-$825_b$. As seen, the various interfaces may be coupled to a buffer memory 820. In addition, a general purpose interface 830 is present that can be coupled to a GPIF dual buffer 835. A clock divider 837 may divide an incoming clock to provide a clock mode for a selected mode to a multiplexer 840, which thus outputs the MPEG transport stream. As seen, MPEG checker 850 may also be present, in addition to an internal interface 860. While shown with this particular implementation in the embodiment of FIG. 10, the scope of the present invention is not limited in this regard.

Output interface 800 is thus a highly configurable MPEG transport stream interface. The transport stream output can be provided through three parallel modes (parallel, parallel A, parallel B) or three serial modes (serial, serial A, serial B) or a general purpose interface mode. The transport stream clock of modes A and B is continuous, frequency-programmable and with no jitter. In one embodiment, an algorithm allows automatically computing the frequency divider to obtain a TS output clock at slightly higher rate than the average byte rate of the broadcast mode programmed.

For modes A, the residual jitter of the transport stream is reported on a TS_VAL signal, which is part of the MPEG-TS output bus (TS_VAL active to signal the payload bytes of the MPEG-TS bus) which then toggles to low level during the payload part, while, for modes B, the payload part is delivered by a burst of 188 bytes (or 188*8 bits for serial B) in 188 (or 188*8) TS clock cycles, and the residual jitter is afterwards reported on the low level duration of the DEN signal between two payloads. For GPIF mode, data are delivered asynchronously (relative to the GPIF clock) by bursts of programmable length (e.g., to 512 bytes in one embodiment).

Additionally, monitoring facilities can be embedded to compute the bit error rate on a transport stream, and the payload can be PRBS23, 0x00, 0xFF, or RAMP compliant, enabling BER monitoring at MPEG-TS level of the receiver tested with standard test equipment.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a first analog-to-digital converter (ADC) to receive a first intermediate frequency (IF) signal of a first digital video broadcast (DVB) standard and to convert the first IF signal to a first digital IF signal;
   a second ADC to receive a second IF signal of a second DVB standard and to convert the second IF signal to a second digital IF signal;
   a shared front end to receive a selected one of the first and second digital IF signals and to convert the selected digital IF signal to a baseband signal;
   a first digital demodulator to digitally demodulate the baseband signal according to the first DVB standard if the baseband signal is from the first IF signal;
   a second digital demodulator to digitally demodulate the baseband signal according to the second DVB standard if the baseband signal is from the second IF signal;
   a first equalizer to perform equalization on the demodulated signal output from the first digital demodulator to obtain a first equalized signal;
   a second equalizer to perform equalization on the demodulated signal output from the second digital demodulator to obtain a second equalized signal;
   a third equalizer to perform equalization on the demodulated signal output from the first digital demodulator to obtain a third equalized signal;
   a shared forward error correction (FEC) circuit to perform forward error correction on the selected one of the first, second, and third equalized signals, wherein the shared FEC circuit includes a first input port to receive the first equalized signal at a beginning location of a signal processing path of the shared FEC circuit, a second input port to receive the second equalized signal at a second location of the signal processing path downstream of the beginning location, and a third input port to receive the third equalized signal at a third location of the signal processing path downstream of the second location; and
   a transport stream interface to receive and output a FEC-corrected signal received from the shared FEC circuit, wherein at least the shared front end, the first and second digital demodulators, the first second and third equalizers, and the shared FEC circuit are integrated on a single semiconductor die.

2. The apparatus of claim 1, further comprising a second FEC circuit to perform forward error correction on the selected second equalized signal when the second equalized signal is of a third DVB standard.

3. The apparatus of claim 2, wherein the first DVB standard is a DVB-terrestrial standard, the second DVB standard is a first DVB-satellite standard, and the third DVB standard is a second DVB satellite standard.

4. The apparatus of claim 1, further comprising a digital signal processor (DSP) coupled to the shared front end, the first and second digital demodulators, the first, second and third equalizers, and the shared FEC circuit to control operation thereof based on the type of received IF signal.

5. The apparatus of claim 4, wherein the shared front end, the first and second digital demodulators, the first, second and third equalizers, and the shared FEC circuit each comprise dedicated circuitry of the single semiconductor die.

6. The apparatus of claim 1, wherein the shared front end includes an automatic gain control (AGC) circuit to receive the first and second IF signals and to generate a first gain control command to send to a tuner to control a gain level of a radio frequency (RF) component of the tuner, and to generate a second gain control command to send to the tuner to control a gain level of an IF component of the tuner.

7. The apparatus of claim 1, wherein the first digital demodulator includes:
 a shared signal processing path including a first selector having a first input to receive a decimated DVB cable signal and a second input to receive a decimated DVB terrestrial signal, wherein the decimated DVB terrestrial signal is filtered in a first filter to perform adjacent channel interference (ACI) filtering, and decimated in a second decimator, and a second configurable filter to perform ACI filtering or Nyquist filtering depending on the selected output of the first selector;
 a terrestrial-specific signal processing path including:
  an impulse noise corrector to receive the second configurable filter output;
  a fast-fourier transform (FFT) engine to generate an orthogonal frequency division multiplexed (OFDM) symbol;
  a common phase estimator (CPE) to estimate phase rotation between the OFDM symbol and a delayed OFDM symbol;
 a cable-specific signal processing path including a timing detector coupled to the first filter and a timing loop filter coupled to the timing detector.

8. The apparatus of claim 1, wherein the transport stream interface includes a plurality of parallel interfaces and a plurality of serial interfaces.

9. A method comprising:
 receiving a selected one of first and second digital intermediate frequency (IF) signals in a shared front end and converting the selected digital IF signal to a baseband signal, the first digital IF signal of a first digital video broadcast (DVB) standard, the second digital IF signal of a second DVB standard;
 digitally demodulating the baseband signal according to the first DVB standard in a first digital demodulator if the baseband signal is from the first IF signal;
 digitally demodulating the baseband signal according to the second DVB standard in a second digital demodulator if the baseband signal is from the second IF signal;
 equalizing the demodulated signal output from the first digital demodulator to obtain a first equalized signal in a first equalizer if the demodulated signal output is from the first IF signal;
 equalizing the demodulated signal output from the second digital demodulator to obtain a second equalized signal in a second equalizer if the demodulated signal output is from the second IF signal;
 equalizing the demodulated signal output from the first digital demodulator to obtain a third equalized signal in a third equalizer if the demodulated signal output is from the first IF signal and is of a third DVB standard;
 performing forward error correction on the selected one of the first, second and third equalized signals in a shared forward error correction (FEC) circuit, wherein the shared FEC circuit includes a first input port to receive the first equalized signal at a beginning location of a signal processing path of the shared FEC circuit, a second input port to receive the second equalized signal at a second location of the signal processing path downstream of the beginning location and a third input port to receive the third equalized signal at a third location of the signal processing path downstream of the second location; and
 receiving and outputting a FEC-corrected signal received from the shared FEC circuit from a transport stream interface, wherein at least the shared front end, the first and second digital demodulators, the first, second and third equalizers, and the shared FEC circuit are integrated on a single semiconductor die.

10. The method of claim 9, further comprising performing forward error correction on the selected second equalized signal in a second FEC circuit when the second equalized signal is of a fourth DVB standard.

11. The method of claim 10, wherein the first DVB standard is a DVB-terrestrial standard, the second DVB standard is a first DVB-satellite standard, the third DVB standard is a DVB-cable standard, and the fourth DVB standard is a second DVB-satellite standard.

12. The method of claim 9, further comprising controlling operation of the shared front end, the first and second digital demodulators, the first, second and third equalizers, and the shared FEC circuit based on the type of received IF signal via a digital signal processor (DSP).

13. The method of claim 9, further comprising receiving the selected IF signal in an automatic gain control (AGC) circuit and generating a first gain control command to send to a tuner to control a gain level of a radio frequency (RF) component of the tuner, and generating a second gain control command to send to the tuner to control a gain level of an IF component of the tuner.

14. The method of claim 13, wherein the first gain control command is encoded as a delta-sigma encoded signal.

15. A system comprising:
 a first tuner formed on a first semiconductor die, the first tuner to receive and downconvert a television signal according to one of a digital video broadcast (DVB)-terrestrial standard and a DVB-cable standard depending on the received television signal;
 a second tuner formed on a second semiconductor die, the second tuner to receive and downconvert a television signal according to a DVB-satellite standard; and
 a multi-standard demodulator coupled to the first and second tuners and formed on a third semiconductor die, the multi-standard demodulator including a first analog-to-digital converter (ADC) to receive a first intermediate frequency (IF) signal from the first tuner and to convert the first IF signal to a first digital IF signal, a second ADC to receive a second IF signal from the second tuner and to convert the second IF signal to a second digital IF signal, a shared front end to receive a selected one of the first and second digital IF signals and to convert the selected digital IF signal to a baseband signal, a first digital demodulator to digitally demodulate the baseband signal according to the DVB-terrestrial standard or the DVB-cable standard if the baseband signal is from the first IF signal, a second digital demodulator to digitally demodulate the baseband signal according to the DVB-satellite standard if the baseband signal is from the second IF signal, a first equalizer to perform equalization on the demodulated signal output from the first digital demodulator to obtain a first equalized signal, a second equalizer to perform equalization on the demodulated signal output from the second digital demodulator to obtain a second equalized signal, a third equalizer to perform equalization on the demodulated signal output from the first digital demodulator to obtain a third equalized signal, a shared forward error correction (FEC) circuit to perform forward error correction on the selected one of the first, second and third equalized signals, wherein the shared FEC circuit includes a first input port to receive the first equalized signal at a beginning location of a signal processing path of the shared FEC circuit when the first equalized signal is of the DVB-terrestrial standard, a second input port to receive the second equalized signal at a second location of the signal processing path downstream of the beginning location, and a third input port to receive the third equalized signal at a third location of the signal processing path downstream of the second location.

16. The system of claim 15, wherein the system comprises a set-top box.

17. The system of claim 15, wherein the system comprises a high definition television.

18. The system of claim 15, further comprising a second FEC circuit to perform forward error correction on the selected second equalized signal when the selected second equalized signal is of a second DVB-satellite standard, the second FEC circuit including a low density parity checker decoder.

19. The system of claim 15, further comprising a multi-standard digital television receiver integrated circuit (IC) including the first and second tuners and the multi-standard demodulator.

20. The system of claim 15, wherein the first and second ADCs are a shared ADC for DVB-terrestrial, DVB-cable, and DVB-satellite reception.

* * * * *